United States Patent [19]

Mazza

[11] 3,802,710

[45] Apr. 9, 1974

[54] RECORD PLAYER HAVING AN AUTOMATIC RECORD-POSITIONING MECHANISM

[75] Inventor: Lamberto Mazza, Pordenone, Italy

[73] Assignee: Industrie A. Zanussi S.p.A., Pordenone, Italy

[22] Filed: Jan. 13, 1972

[21] Appl. No.: 217,618

[30] Foreign Application Priority Data

Jan. 16, 1971 Italy ................................ 19444/71

[52] U.S. Cl. ................................................ 274/9 B

[51] Int. Cl. ......................... G11b 3/00, G11b 25/04

[58] Field of Search .......................................... 274/9

[56] References Cited

UNITED STATES PATENTS 3,141,676 7/1964 Zarm ................................ 274/9 R 2,508,715 5/1950 Harman ............................ 274/9 B 2,943,861 7/1960 Redfield ........................... 274/9 B

*Primary Examiner*—Harry N. Haroian

*Attorney, Agent, or Firm*—Holman & Stern

[57] ABSTRACT

An automatic record player in which the records to be played are introduced through a slot formed in the machine casing, the improvement consisting in that provisions are made for using the machine for playing records of different diameters. Abutment means are provided, which adjust themselves automatically to the diameter of the record being introduced through the slot, so that the record is automatically centered as these abutment means engage the peripheral edge of the record. Other conventional automatic mechanisms, as usual in automatic (portable) record players can be incorporated in the machine.

9 Claims, 8 Drawing Figures

RECORD PLAYER HAVING AN AUTOMATIC RECORD-POSITIONING MECHANISM

BACKGROUND OF THE INVENTION

This invention is particularly related to the automatic record players of the slot type, that is, record-players in which a phonograph record is introduced through a specially provided slot of the casing and automatic devices position the record on the turntable and the pick-up needle on the starting groove of the record, as well as eject the record after playing.

OBJECT AND SUMMARY OF THE INVENTION

An object of the present invention is to provide a record player adapted to automatic operation and capable of playing phonograph records of different diameters, without any necessity for a manual adjustment so as to position the record in a position concentric with the turntable, or to position the pick-up needle on the first or starting groove.

The present invention, more exactly, is intended to widen the field of use of a totally automatic operation, as known for record players which play records of a single diameter only, without introducing unnecessary intricacy of mechanisms and without requiring a too bulky assembly.

The record player according to the present invention comprises a part which is movable relative to the turntable, in a direction substantially towards the axis of rotation of the turntable, from a lifted position to a lowered position; on this movable part a slide is slidable on which a record can be placed when the movable part is lifted; at least one member is movable on said slide and is brought, due to its engagement with the record placed on said slide, to a position which is a function of the record diameter; for each of a number of positions of said member, an abutment is provided on said movable part so that when the latter is in its lifted position, the slide can be moved from an at rest position to a stop position due to the engagement between said member and the abutment corresponding to its position on the slide. Each abutment is arranged on the movable part so that, in the stop position of the slide, the record borne thereby is in a position substantially concentric with the turntable: by so doing the movement of the movable part from the lifted position to the lowered position lays the record on the turntable, disengaging the record from the slide.

According to a preferred embodiment, the slide is switched from the at rest position to any of the stop positions against the bias of resilient means and holding means are provided, which can be disengaged from the slide in the vicinity of the stop position; said means are disengaged from the slide when the movable part is displaced from the lowered position to the lifted position, by lifting the record from the turntable and placing it on the slide, it being obvious that the slide now is resiliently brought back to its at rest position and carries the record therewith.

It is advisable that stops may be arranged on the slide for a record which is placed therein with a movement which is substantially parallel to the slide itself, so that the slide can be resiliently shifted from its at rest position by a thrust imparted to the record.

The movable members mounted on the slide and responsive to the diameter of a record are advantageously formed by at least one lever whose pivotal axis is substantially perpendicular to the record placed on the slide; resilient means are active on the lever in the sense of rotating it for having an end of the lever pressing against the record edge: it is obvious that the orientation of the lever engaging the record with one of its ends is varied as a function of the curvature and thus of the diameter of the record.

Integral with said lever, for example, at the other end thereof, there is a pin which, for every position of a plurality of positions of the lever, corresponding to the several possible diameters of the records, is placed in registry with a guide on the movable part which is parallel to the direction of sliding of the slide; the termination of the guide is an appropriate abutment to stop the travel of the slide and the pin travels along the guide while the slide moves.

These and other objects and features of the record player according to the present invention will become more clearly apparent from the ensuing description of an exemplary embodiment thereof as illustrated in the accompanying drawings, wherein:

DETAILED DESCRIPTION OF THE INVENTION

Figure 1:
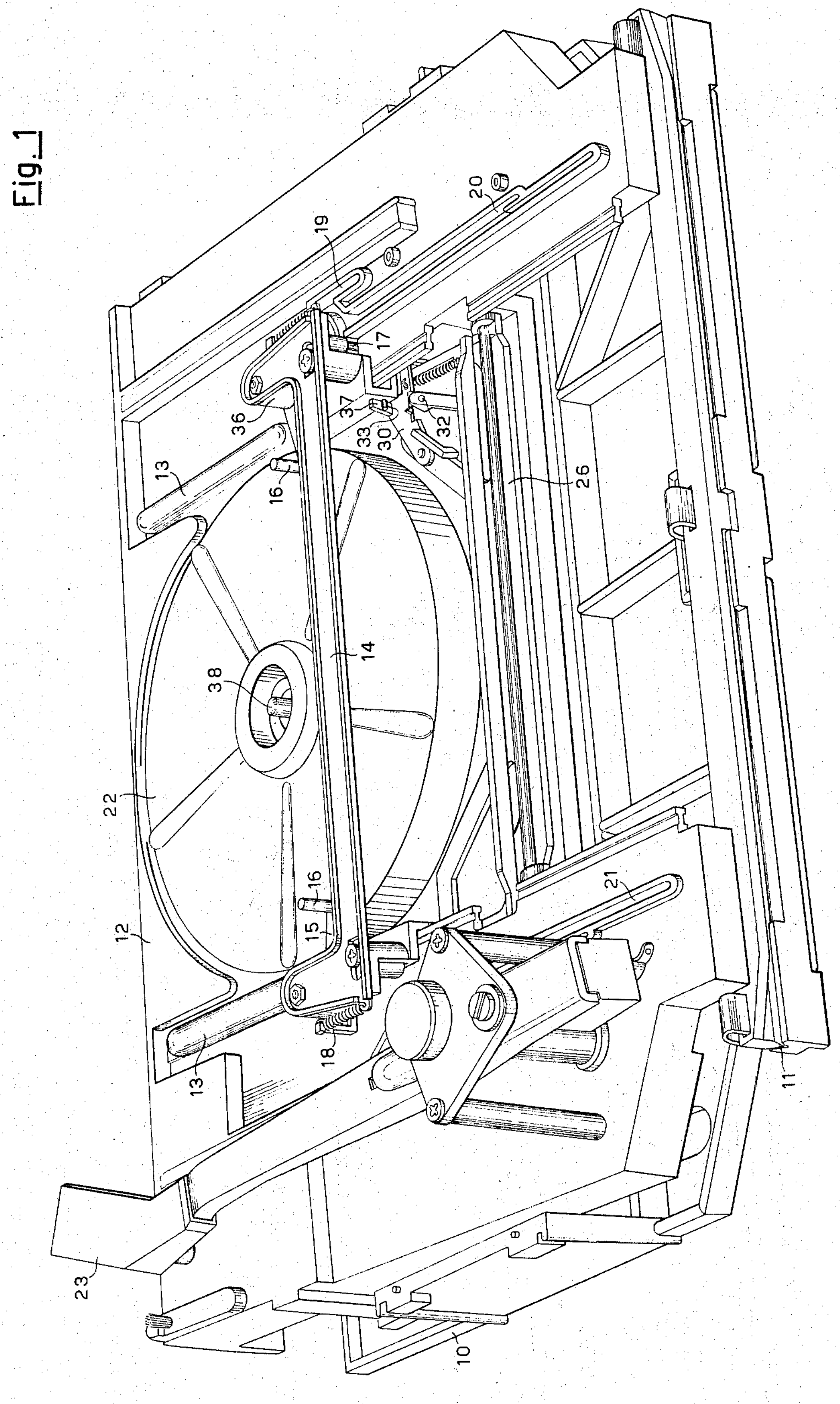
FIG. 1 is a perspective view of the record-player.
Figure 2:
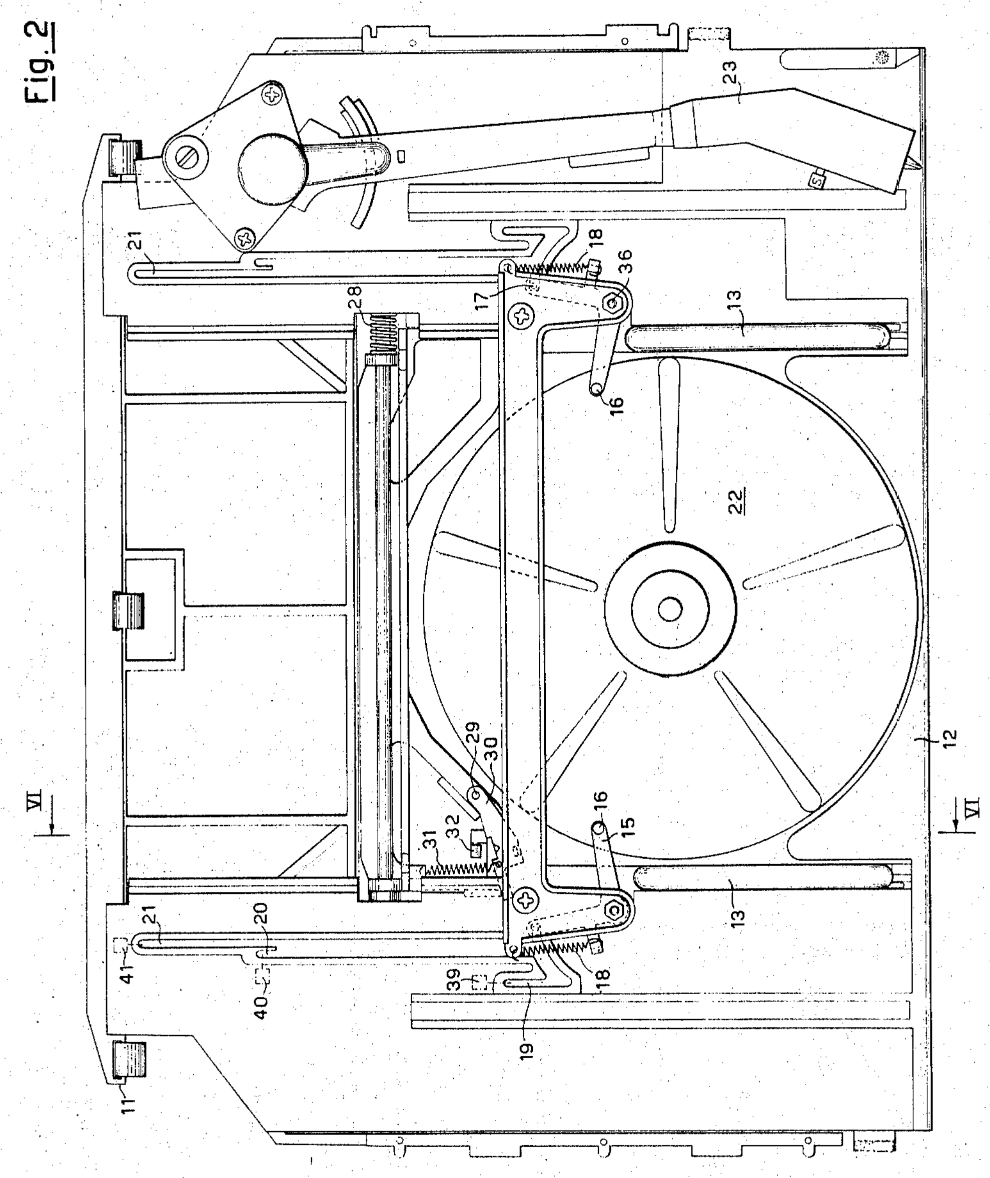
FIG. 2 is a plan view of the same record-player.

As shown in FIGS. 1 and 2, the record player comprises a fixed portion or support 10 to which is connected, by means of a knife-edge hinge 11, an upper swinging portion or movable part 12 on which a slide moves and which comprises two pads 13 united by a cross-tie 14. To each of the pads 13 is pivoted at 36 a bell crank lever 15, to which are affixed two pins 16 and 17, and the lever is allowed to rotate against the bias of a spring 18. The pin 17, for different angular positions of the lever 13 can be positioned in correspondence with three guides or slots 19, 20 and 21 on the platform: it will be noted that the guides 20 and 21 are not separated by a diaphragm or wall along a certain portion thereof. The fixed portion 10 supports for rotation a turntable 22, which is driven to rotation by motive means, not shown.

Figure 6:
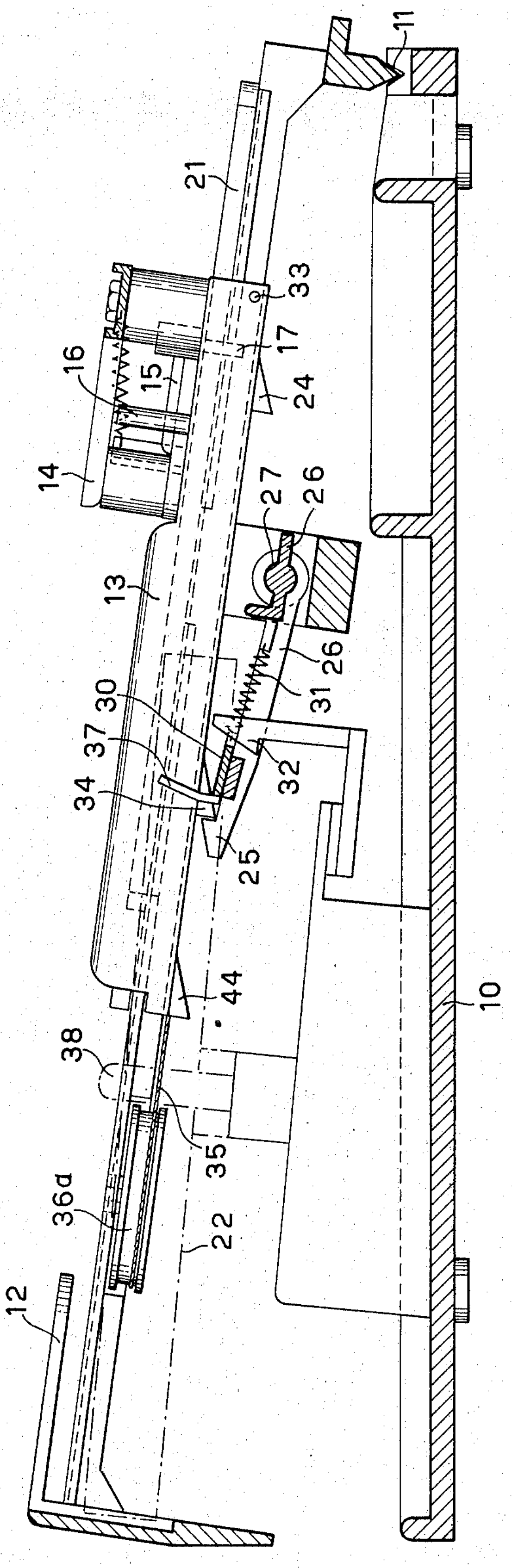
FIG. 6 is a cross-sectional view taken along the line VI—VI of FIG. 2, the view looking in the direction of the arrows.

On the movable part is also rotatably supported in any conventional manner, a pick-up arm 23. As best shown in FIG. 6, beneath the pads 13, teeth 24, 34 and 44 are formed, which are engaged by teeth 25 provided on a frame 26, with the latter being pivoted at 27 to the part 12 and thrust upwards by spring 28 (FIG. 2). On the frame 26 there is, pivoted at 29, a plate 30 controlled by a spring 31: in correspondence with the plate a tooth 32 is provided, which is integral with the fixed portion 10, and an abutment 33 which operates in the at rest position of the slide, on a vertical extension 37 of the plate 30. The movement of the slide away of the at rest position as shown in FIGS. 1 and 2 takes place against the tensional bias of a wire 35 affixed thereto, which is wound around a roller 36a, with the latter containing resilient means (not shown) which bias is in the sense of winding the wire 35 on the roller.

The indicated component parts and possibly other will be better defined as to their structures and functions in the following description of the operation of the record-player shown herein.

As outlined above, the position shown in FIG. 2 is the idle position: in the slide formed by the pads 13 there can be housed a record with a movement which is substantially a sliding movement thereon.

Figure 3:
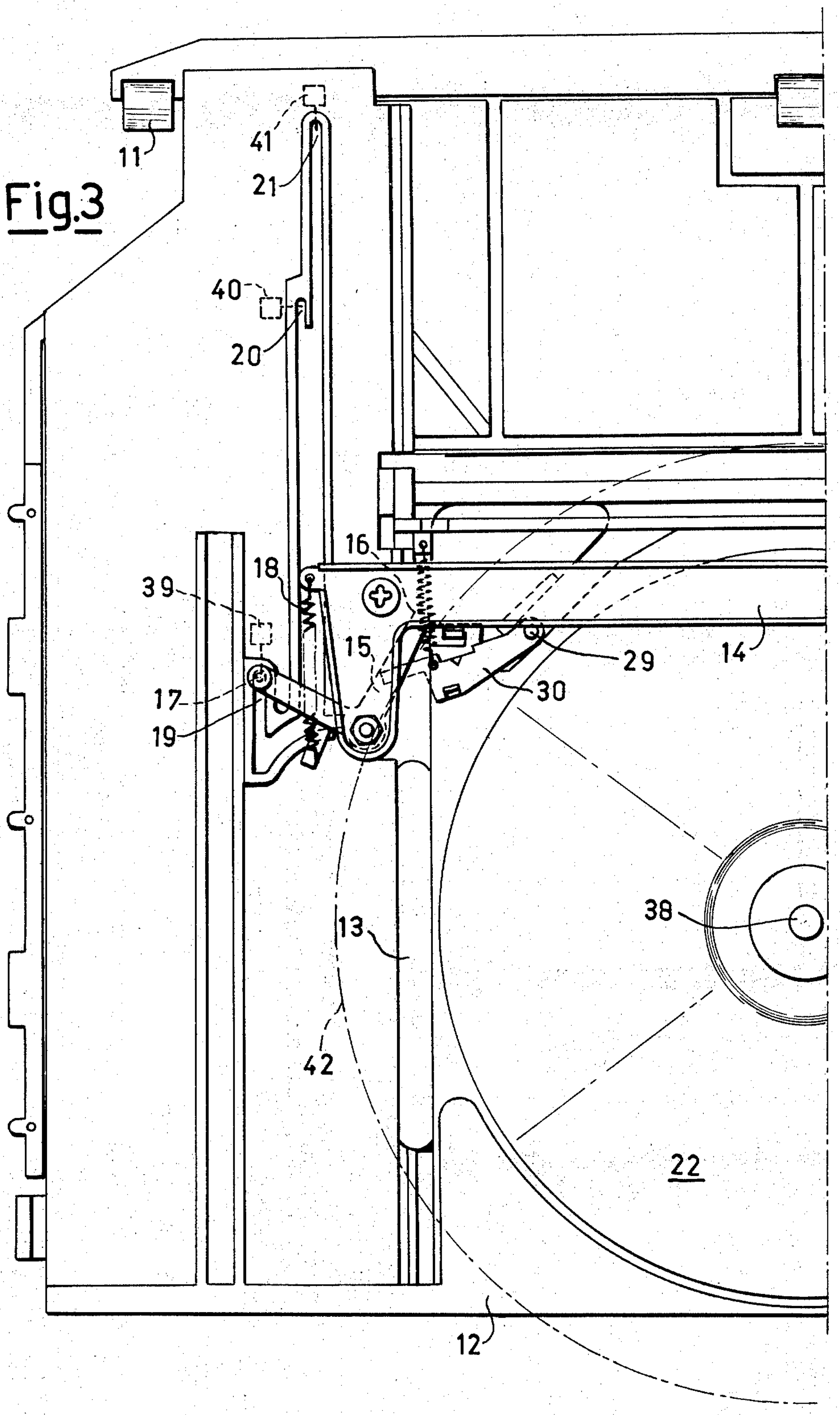
FIGS. 3, 4 and 5 are partial plan views, similar to FIG. 2, for different positions of component parts of the record player when a record is introduced.
Figure 4:
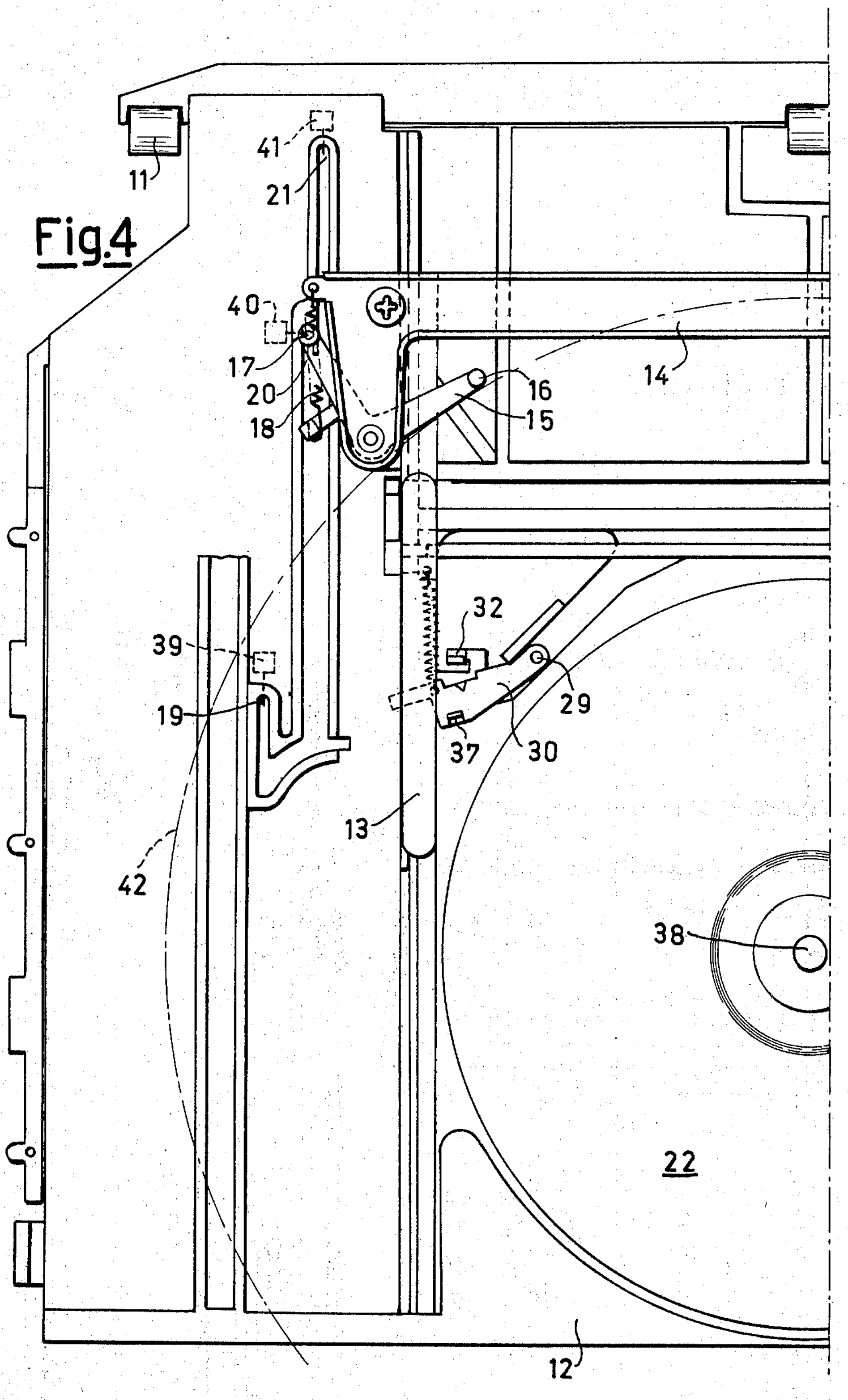
Figure 5:
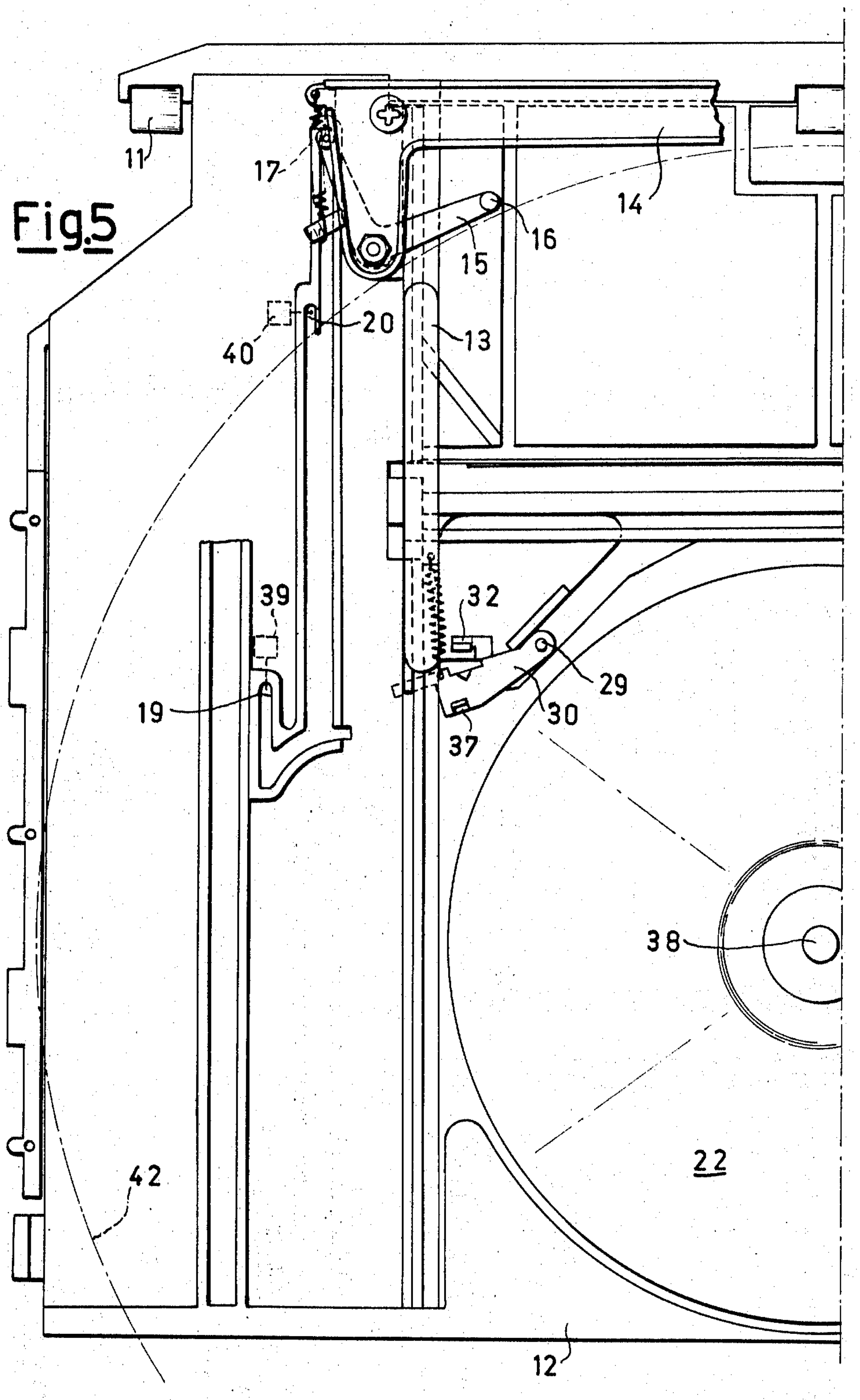

The record is stopped against the abutments formed by the pins 16 and the pins 16 rest on the periphery of the record. The position of these pins and thus the degree of rotation of the levers 15 is obviously varied as the diameter of the introduced record is varied. In correspondence with three standard diameters of records, the pins 17 are brought in registry with one of the three guiding slots 19, 20 and 21; then the slide can be urged forwards by merely manipulating the record until reaching the end of the selected guideway. The three end positions, in the case of three different diameters of the records 42 are clearly shown in FIGS. 3, 4 and 5 wherein also the operability of the levers 15 can be appreciated.

The teeth 24, or 34 or 44, beneath the pads 13 engage the tooth 25 according to whether the slide reaches the end of the respective guides 19, or 20, or 21. For example, in FIG. 6 there is shown how the teeth 34 and 25 are engaged when the pad 13 is in the position shown in FIG. 4, that is when a record having an intermediate diameter is carried by the slide. The engagement of the teeth 34 and 25 prevents the wire 35 from moving the slide to the at rest position. At this stage, the movable part 12 is lowered either manually or by an automatic control, for example, by the agency of a small electric motor fed through a switch which is closed by the positioning of the pin 17 at the end of one of the guides 19, 20 or 21: as the lowering movement is over, the part 12 is in the position shown in FIG. 7. The means for holding the part 12 in the several positions is not shown: it can be formed by simple latches in the case of manual control or, in the preferred automatic embodiment, by the stoppage of the motor which controls the movement of the movable part. It is apparent that at the end of the lowering movement of the part 12, the record is borne by the turntable 22 which is now in a position above the pads 13. The importance will now clearly be appreciated that the slide is stopped when the record supported is substantially concentric with the turntable so that a centering pin 38 may enter the central hole of the record so as to effect the exact centering thereof as the part 12 is lowered.

Figure 7:
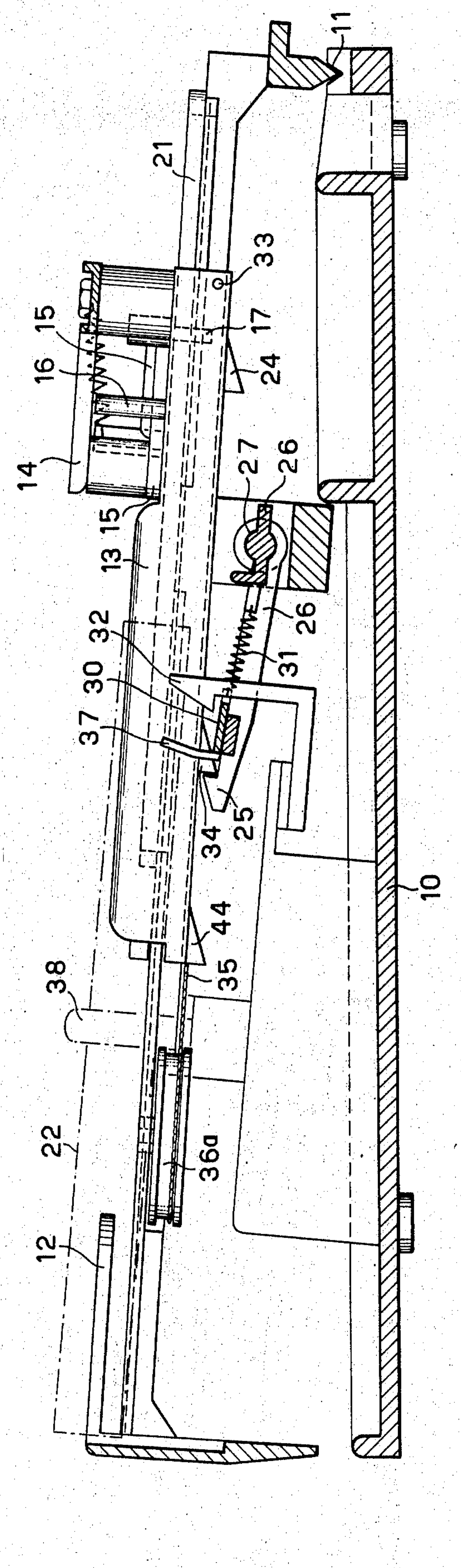
FIGS. 7 and 8 are partial cross-sectional views, similar to FIG. 6, for different positions of the component parts of the record player.

When the record player is in the position of FIG. 7, the record can be played and to this end the arm 13 must be placed with the pick-up needle (not shown) carried thereby, in registry with the starting groove of the record as the record is set to rotation. The arm positioning can be either manual or automatic. As a matter of fact, according to whether the pin 17 is at the termination of the guide 19, or 20, or 21, a determined command can be transmitted to the arm-moving means which control the positioning on the starting groove of the record which has the diameter as determined by the guide in which the pin 17 has entered. These automatic arm positioning means have not been shown in the accompanying drawings since they are present in several kinds of record-players, for example the automatic record-changers, and, in the record-player according to the present invention, they can be of any appropriate conventional type. The control members can be arranged with advantage, for example, at the termination of the guides, in a position 39, 40 and 41, respectively, and can transmit the signal both to the arm-moving means and the motive means for the movable part 12 as described above.

Figure 8:
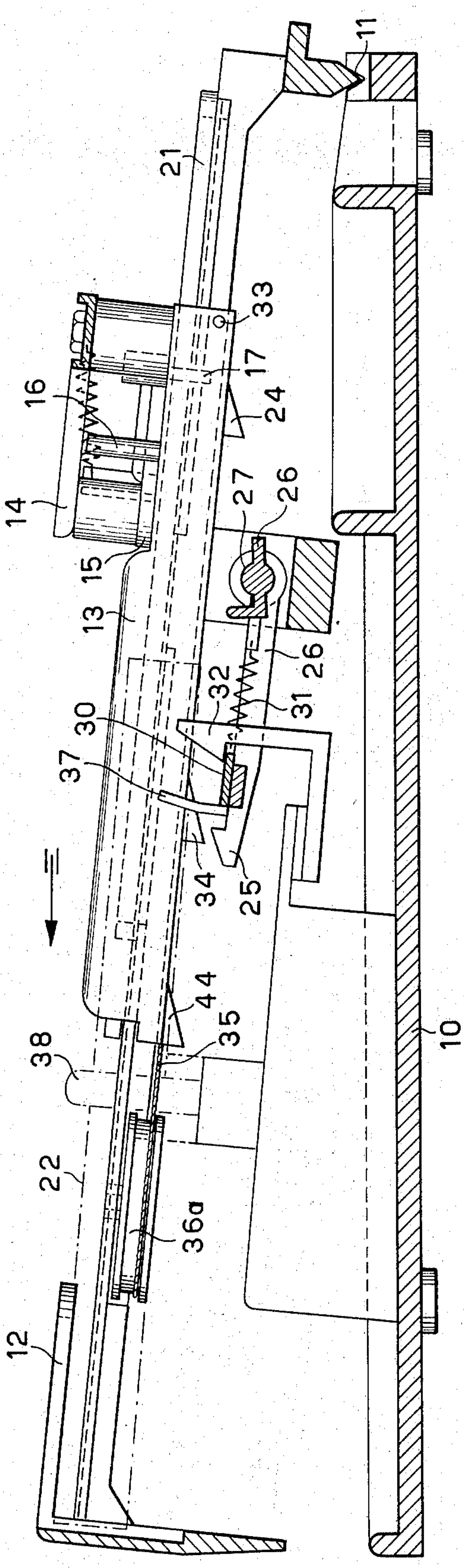

Once a record has been played, the arm, as in the usual record players is returned to the at rest position and the movable part 12 can be lifted again. Nevertheless, the plate 30 remains engaged by the hook 32 so that the frame 26 cannot follow the lifting movement of the part 12. The hook 25 is disengaged from the hook 34 and the slide carrying the record, acted upon by the wire 35, returns to the at rest position as shown in FIG. 8, with its stroke being thus ended in the at rest position. As the latter position is attained, the abutment 33 impinges on the extension 37 of the plate 30 and disengages it from the tooth 32, displacing the plate against the bias of the spring 31. By so doing, the frame 26 can be lifted by the action of the wound spring 28.

All the component parts of the record player are arranged as shown in FIGS. 1 and 2 whenever the record is with-drawn from the slide, and the cycle described above can thus be repeated.

The record player can be housed in an outer cabinet, not shown, having as the single opening a slot through which a record can be introduced in the slide in a direction which is substantially parallel to the direction of travel of the slide. By pushing the record as it is introduced, it is possible to displace the slide, which is automatically stopped when the record is concentric with the turntable: it is especially in such a case that the movement of the movable part 12 and the arm 23 is advantageously controlled by the motive means housed in the record player.

Of course, many alternative embodiments can be provided for the record player according to the present invention. For example, the part 12 can be fixed and the turntable 22 can be movable, conversely, for supporting the record. Different forms can also be provided for the holding and unlatching mechanism formed by the frame 26 and the component parts carried thereby; similarly, the diameter-responsive members, which are in the present case the two bell crank levers 15, can have various configurations and also be present in different numbers, even a single one, for example.

Be it understood that the main feature of the device according to the invention is the fact that substantially all the operation preliminary to playing a selected record ( such as selection of the speed change, record centering, depression of the movable part, initial positioning of the pick-up arm etc.) as well as the ejection of the record after it has been played, are controlled either directly or through members controlled thereby, by a single component part which is the slide.

What is claimed is:

1. A record player for playing phonograph records of different diameters, comprising a support, a turntable mounted on the support, a platform for receiving a record to be played, means mounting the platform to the support for relative movement with respect to the turntable between a first position in which the turntable is disengaged from a record and a second position in which the turntable is ready to support a record and rotate the record upon activation of the turntable, the improvement comprising a slide movable on the platform, two abutments integral with the slide and symmetrical with respect to a plane containing the axis of the turntable and which is parallel to the direction of movement of the slide, with the periphery of a record positioned on the slide being in contact with said two abutments, at least one member displacable on the slide as a function of the diameter of the record positioned thereon, a plurality of abutments for said platform, said at least one member including a component for stopping the movement of the slide by engagement against one of the plurality of abutments, and each of the plurality of abutments corresponding to one position of the displacable member so that the slide can be moved from an at-rest position to an abutment position in which the record carried by the slide is concentric with the turntable.

2. The record player as claimed in claim 1, including resilient means against which the slide is moved from the at-rest position to the stoppage position and disengageable holding means for the slide in correspondence of each of the stoppage positions.

3. The record player as claimed in claim 2, in which the disengageable holding means is actuated by a relative movement of the record and the platform from the second position to the first position.

4. The record player as claimed in claim 1, in which said abutments transfer to the slide the thrust applicable to the record for moving the slide from the at-rest position to the stoppage position corresponding to the diameter of the record.

5. The record player as claimed in claim 1, in which said displacable member is a bell crank lever pivoted with an axis substantially perpendicular to the platform, a first arm of the lever being arranged in correspondence with the periphery of the record when the record rests on the slide, the second arm of the lever defining said component which stops the slide movement by the engagement with one of said plurality of abutments and resilient means for urging said bell crank lever in a direction for applying the first arm thereof to the periphery of the record.

6. The record player as claimed in claim 5, including a plurality of guides provided on the platform and extending parallel to the movement of the slide, the second arm of the bell crank lever being defined by an extension carried by the movement of the lever as determined by the record placed on the slide in correspondence with the beginning of one of the plurality of guides, with said extension travelling over one of said guides when the slide is moved from its at-rest position to the stoppage position, and determination of the guides defining the abutments which stop the movement of the slide.

7. The record player as claimed in claim 1, including a mechanism controlling the relative movement of the turntable and the platform from the first position to the second position, and said displaceable member which is displaceable as a function of the diameter of the record when it engages one of the abutments being operably related to said mechanism.

8. The record player as claimed in claim 1, including a pick-up arm having a needle, a device for controlling the positioning of the pick-up arm, and said displaceable member which is displaced as a function of the diameter of the record when it engages one of said abutments being operably related to said device.

9. The record player as claimed in claim 8, including a device for controlling the mutual movement of the turntable and the platform from the second position to the first position, and the pick-up arm, at the end of playing of the record effects a backward movement toward the at-rest position and at the end of said movement activates said device controlling the mutual movement of the turntable and platform.

* * * * *